United States Patent Office 3,318,835
Patented May 9, 1967

3,318,835
COMPOSITIONS CONTAINING POLYPROPYLENE AND AN ESTER PLASTICIZER
Hugh J. Hagemeyer, Jr., Vernon K. Park, and Alfred G. Robinson III, Longview, Tex., assignors to Eastman Kodak Company, Rochester, N.Y., a corporation of New Jersey
No Drawing. Filed Mar. 10, 1965, Ser. No. 438,783
17 Claims. (Cl. 260—31.6)

This application is a continuation-in-part of copending application Serial No. 161,358, filed Dec. 22, 1961 and now abandoned.

This invention relates to polypropylene. More particularly, this invention is concerned with novel plasticized polypropylene compositions characterized by low brittleness at low temperatures.

Polypropylene of high crystallinity has many properties which make it useful. One property which limits its use in potential products is its high brittle point. The brittle point can be characterized as the temperature at which the polymer exhibits brittle failure under specific impact conditions, such as measured by ASTM test D746–555. Because polypropylene gives relatively poor performance in products subjected to low temperatures such as frozen food containers, wire and cable insulation, plastic pipe and other products used outside in cold climates, its utility has been limited.

Plasticizers used previously with other plastics are not suitable for improving the brittle point of polypropylene because such plasticizers lower the tensile strength and/or adversely affect other physical properties, such as the melting point and stiffness, of polypropylene. Also, many materials used as plasticizers are not compatible with polypropylene.

According to the present invention, there are provided novel compositions of solid polypropylene containing, in admixture therewith, a polyester comprising 2,2,4-trimethyl-1,3-pentanediol monoalkanoate (containing 2 to 8 carbon atoms) esterified with a dicarboxylic acid. Although the invention relates broadly to the polypropylene compositions just noted, it will be described more particularly with reference to novel compositions of solid polypropylene containing, in admixture therewith, a polyester comprising 2,2,4-trimethyl-1,3-pentanediol monoisobutyrate (Texanol) esterified with a dicarboxylic acid. 2,2,4-trimethyl-1,3-pentanediol monoisobutyrate is readily prepared. The preparation is described in U.S. Patent No. 3,091,632 issued May 28, 1963. The polyester functions to plasticize polypropylene and to give it improved low temperature properties, and particularly a low brittle point. The improved low temperature properties are obtained without causing an unduly severe reduction in tensile strength and other desirable physical properties.

Among the polyesters that can be advantageously admixed with crystalline polypropylene to obtain improved low temperature properties are the polyesters obtained by esterifying 2,2,4-trimethyl-1,3-pentanediol monoisobutyrate with dicarboxylic acids of the formula

HOOC—R—COOH wherein R is (a) a chemical bond, (b) a straight or branched alkylene group and particularly an alkylene having one to twelve carbons such as methylene, ethylene and propylene, (c) a straight or branched alkenylene group and particularly an alkenylene having one to twelve carbons such as ethylene, propenylene and 2-butenylene, (d) an aromatic group and particularly phenylene or naphthylene, (e) a cycloalkylene group such as cyclohexylene and (f) the groups —R′—O—R′ and

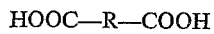

—R′—S—R′— in which R is an alkylene, particularly a lower alkylene such as methylene and propylene. Although such compounds are generally referred to herein as polyesters, they are primarily diesters.

Other 2,2,4-trimethyl - 1,3 - pentanediol monoalkanoate compounds, in addition to 2,2,4-trimethyl-1,3-pentanediol monoisobutyrate, that can be used to prepare the polyester plasticizer compounds used in preparing the polypropylene compositions of our invention include 2,2,4-trimethyl-1,3-pentanediol monoacetate, 2,2,4-trimethyl-1,3-pentanediol monopropionate, 2,2,4-trimethyl-1,3-pentanediol monoisopropionate, 2,2,4-trimethyl-1,3-pentanediol monobutyrate, 2,2,4-trimethyl-1,3-pentanediol monopentanoate, 2,2,4-trimethyl-1,3-pentanediol monoisovalerate, 2,2,4-trimethyl-1,3-pentanediol monohexanoate, 2,2,4-trimethyl - 1,3 - pentanediol monoheptanoate and 2,2,4-trimethyl-1,3-pentanediol monocaprylate, for example.

Illustrative of the dicarboxylic acids which can be used to form the polyesters are, for example, oxalic acid, malonic acid, succinic acid, glutaric acid, 2,2-dimethylglutaric acid, adipic acid, 2,2,4-trimethyl adipic acid, azelaic acid, sebacic acid, maleic acid, fumaric acid, glutaconic acid, itaconic acid, allylmalonic acid, o-phthalic acid, isophthalic acid, terephthalic acid, diglycolic acid and 1,4-cyclohexane dicarboxylic acid, or anhydrides thereof.

French Patent 1,359,112 discloses the polyesters obtained by esterifying 2,2,4-trimethyl - 1,3 - pentanediol monoisobutyrate with dicarboxylic acids and methods of preparing the polyesters.

Illustrative of the polyesters which can be admixed with solid polypropylene are bis-(2,2,4-trimethyl-1,3-pentanediol monoisobutyrate) oxalate,
bis-(2,2,4-trimethyl-1,3-pentanediol monoisobutyrate) malonate,
bis-(2,2,4-trimethyl-1,3-pentanediol monoisobutyrate) succinate,
bis-(2,2,4-trimethyl-1,3-pentanediol monoisobutyrate) glutarate,
bis-(2,2,4-trimethyl-1,3-pentanediol monoisobutyrate) 2,2-dimethylglutarate,
bis-(2,2,4-trimethyl-1,3-pentanediol monoisobutyrate) adipate,
bis-(2,2,4-trimethyl-1,3-pentanediol monoisobutyrate) 2,2,4-trimethyl adipate,
bis-(2,2,4-trimethyl-1,3-pentanediol monoisobutyrate) azelate,
bis-(2,2,4-trimethyl-1,3-pentanediol monoisobutyrate) sebacate,
bis-(2,2,4-trimethyl-1,3-pentanediol monoisobutyrate) maleate,
bis-(2,2,4-trimethyl-1,3-pentanediol monoisobutyrate) o-phthalate,
bis-(2,2,4-trimethyl-1,3-pentanediol monoisobutyrate) isophthalate,
bis-(2,2,4-trimethyl-1,3-pentanediol monoisobutyrate) terephthalate,
bis-(2,2,4-trimethyl-1,3-pentanediol monoisobutyrate) diglycolate,
bis-(2,2,4-trimethyl-1,3-pentanediol monoisobutyrate) 1,4-cyclohexane dicarboxylate,
bis-(2,2,4-trimethy1-1,3-pentanediol acetate) adipate,
bis-(2,2,4-trimethy1-1,3-pentanediol acetate) succinate,
bis-(2,2,4-trimethy1-1,3-pentanediol propionate) adipate,
bis-(2,2,4-trimethy1-1,3-pentanediol propionate) terephthalate,
bis-(2,2,4-trimethy1-1,3-pentanediol butyrate) adipate,
bis-(2,2,4-trimethyl-1,3-pentanediol butyrate) succinate,
bis-(2,2,4-trimethyl-1,3-pentanediol pentanoate) adipate, bis-(2,2,4-trimethyl-1,3-pentanediol pentanoate) glutarate,
bis-(2,2,4-trimethyl-1,3-pentanediol isovalerate) adipate,
bis-(2,2,4-trimethyl-1,3-pentanediol hexanoate) adipate,
bis-(2,2,4-trimethyl-1,3-pentanediol hexanoate) azelate,
bis-(2,2,4-trimethyl-1,3-pentanediol heptanoate) adipate,
bis-(2,2,4-trimethyl-1,3-pentanediol heptanoate) succinate,
bis-(2,2,4-trimethyl-1,3-pentanediol caprylate) succinate.

Depending on the amount and particular polyester plasticizer used the brittle point of crystalline polypropylene can be reduced to very low temperatures while the softening point is maintained at an adequately high level. When the polyester is added in sufficient amount, the resulting polypropylene has a brittle point of less than 0° C. Only a small amount of the polyester need be admixed with the polypropylene to increase its low temperature properties. Although smaller amounts such as little as 1% by weight of polyester have a beneficial effect on the polypropylene, it is generally advisable to include at least about 5% of the polyester in the polypropylene. Furthermore, the polyester content can be increased higher such as up to about 25-30% of the combined weight of polypropylene and polyester admixture composition but generally above about 25% the tensile strength decreases rather quickly. Inasmuch as the tensile strength decreases as the percentage of polyester in the polypropylene increases only the amount of polyester needed to obtain the desired brittleness temperature should be used. Normally no more than about 10% by weight of the polyester is incorporated into the polypropylene.

Admixing of the polypropylene and polyester can be effected by means of conventional apparatus and blending procedures. Thus mill-rolls or a Banbury mixer can be used to interblend the materials at a mixing temperature above the melting point of the polypropylene.

In order to prevent excessive oxidation, it is advisable to incorporate a suitable oxidation inhibitor in the polypropylene. An antioxidant stabilizer such as 4,4'-thio-bis-(6-tertiary-butyl-m-cresol) can be added during the blending operation.

Typical of the crystalline polypropylenes which can be used in this invention are those having a molecular weight of about 25,000 to 250,000, and advisably of about 50,000 to 200,000, and a melting point of about 162 to 171° C.

Prior to incorporating the additive, about 0.2% by weight of the oxidation inhibitor, 4,4'-thio-bis (6-tertiary-butyl-m-cresol) was incorporated into the polypropylene by milling at 190° C. for 5 to 10 minutes. The blends were prepared by milling the polypropylene with varying amounts of diester plasticizer at 190° C. for 5 to 10 minutes. The compositions thus obtained were granulated and test samples were prepared by injection molding on a 2–3 oz. Impco molding machine. The polypropylene was compatible with each of the diester plasticizers. The resulting data are summarized in Table 2 which includes corresponding data for the unblended polypropylene.

TABLE 1

[Physical properties of polypropylene with and without bis-(2,2,4-trimethyl-1,3-pentanediol monoisobutyrate)adipate]

| | Sample | | | |
|---|---|---|---|---|
| | 1 | 2 | 3 | 4 |
| Polypropylene, percent | 100 | 95 | 90 | 70 |
| Diester, percent | 0 | 5 | 10 | 30 |
| Properties of Product: | | | | |
| Flow Rate at 230° C | 3.50 | 11.50 | 15.20 | 35.00 |
| Density | .9092 | .9102 | .9120 | .9182 |
| Tensile Strength, p.s.i. at yield | 4,460 | 3,990 | 3,490 | 2,600 |
| Stiffness in Flexure | 132,000 | 114,700 | 94,900 | 65,000 |
| Brittleness Temperature, ° C | +18 | −16 | −20 | −35 |
| Vicat Softening Point, ° C | 145.00 | 142.10 | 140.30 | 134.20 |

The brittleness temperature in the example was determined by ASTM method D746-555.

*Example 2*

The compositions set forth in Table 2 hereinafter were prepared by milling the crystalline polypropylene with the polyester plasticizer at 190° C. for 5 to 10 minutes. The plasticizers and the amounts employed are set forth in the tabulation. The crystalline polypropylene, as in Example 1, contains about 0.2% by weight of the oxidation inhibitor, 4,4'-thio-bis(tertiary-butyl-m-cresol). The compositions thus obtained were granulated and test samples were prepared by injection molding on a 2–3 oz. Impco molding machine. The polypropylene was compatible with each of the diester plasticizers. The resulting data are summarized in Table 2 which includes corresponding data for the unblended polypropylene.

TABLE 2

[Physical properties of polypropylene and polypropylene compositions containing polyesters of TMPDMI [1]]

| Physical Properties | Unmodified Polypropylene | Blends of Polypropylene with Polyesters of TMPDMI and— | | | | |
|---|---|---|---|---|---|---|
| | | Succinic Acid | 2,2,4-Trimethyl Adipic Acid | Isophthalic Acid | Diglycolic Acid | Maleic Acid |
| Weight Percent Polyester | 0 | 5 | 5 | 5 | 10 | 10 |
| Flow Rate at 230° C | 1.95 | 10.5 | 12.0 | 10.2 | 24.0 | 28 |
| Brittleness Temperature, ° C | +18 | −15 | −16 | −16 | −20 | −22 |
| Stiffness in Flexure | 148,300 | 115,300 | 118,000 | 116,000 | 95,400 | 90,600 |
| Tensile Strength, p.s.i., at Yield | 4,600 | 3,950 | 3,870 | 3,900 | 3,400 | 3,300 |
| Vicat Softening Point, ° C | 145.2 | 145.5 | 141.0 | 139.5 | 138.0 | 138.0 |

[1] TMPDMI=2,2,4-trimethyl-1,3-pentanediol monoisobutyrate.
The brittleness temperature was determined by ASTM Method D746-555.

The polypropylene-polyester plasticizer compositions provided by this invention are transparent, tough and flexible, and do not show permanent flow below their melting points or diffusion of the plasticizer from the semi-crystalline matrix. The compositions may be employed where conventional polypropylene can be used but are particularly useful in applications where flexibility is required such as for low temperature wrapping materials, packaging material for frozen foods, wire and cable insulation and plastic pipe.

The following example is presented to illustrate the invention.

*Example 1*

A series of blends was prepared using crystalline polypropylene with varying amounts of diester plasticizer.

Polyesters derived from 2,2,4-trimethyl-1,3-pentanediol monoalkanoates other than 2,2,4-trimethyl-1,3-pentanediol monoisobutyrate when incorporated in polypropylene likewise give polypropylene compositions having a lower brittleness temperature than the unmodified polypropylene. These polyesters yield the same advantages as those described more particularly with respect to the polyesters derived from 2,2,4-trimethyl-1,3-pentanediol monoisobutyrate.

Although the invention has been described in considerable detail with particular reference to certain preferred embodiments thereof, variations and modifications can be effected within the spirit and scope of the invention as described hereinbefore, and as defined in the appended claims.

What is claimed is:

1. Solid polypropylene in admixture with a polyester of 2,2,4-trimethyl-1,3-pentanediol monoisobutyrate with a dicarboxylic acid selected from oxalic acid, malonic acid, succinic acid, glutaric acid, 2,2-dimethylglutaric acid, adipic acid, 2,2,4-trimethyl adipic acid, azelaic acid, sebacic acid, maleic acid, fumaric acid, glutaconic acid, itaconic acid, allylmalonic acid, o-phthalic acid, isophthalic acid, terephthalic acid, diglycolic acid or 1,4-cyclohexane dicarboxylic acid, said polyester comprising about 1 to 25% by weight of the admixture.

2. A composition according to claim 1 in which said polyester is at least 5% by weight of the admixture.

3. Solid polypropylene in admixture with a polyester of 2,2,4-trimethyl-1,3-pentanediol monoisobutyrate with a dicarboxylic acid of the group consisting of compounds of the formulas HOOC—COOH, HOOC—R—COOH, HOOC—R'—O—R'—COOH and

HOOC—R'—S—R'—COOH wherein R is a member of the group consisting of alkylene, alkenylene, aromatic and cycloalkylene groups, and R' represents an alkylene group, said polyester comprising about 1 to 25% by weight of the admixture.

4. Solid polypropylene in admixture with about 1 to 25% of the polyester bis-(2,2,4-trimethyl-1,3-pentanediol monoisobutyrate) adipate.

5. Solid polypropylene in admixture with about 1 to 25% of the polyester bis-(2,2,4-trimethyl-1,3-pentanediol monoisobutyrate) succinate.

6. Solid polypropylene in admixture with about 1 to 25% of the polyester bis-(2,2,4-trimethyl-1,3-pentanediol monoisobutyrate) glutarate.

7. Solid polypropylene in admixture with about 1 to 25% of the polyester bis-(2,2,4-trimethyl-1,3-pentanediol monoisobutyrate) 2,2-dimethylglutarate.

8. Solid polypropylene in admixture with about 1 to 25% of the polyester bis-(2,2,4-trimethyl-1,3-pentanediol monoisobutyrate) 2,2,4-trimethyladipate.

9. Solid polypropylene in admixture with about 1 to 25% of the polyester bis-(2,2,4-trimethyl-1,3-pentanediol monoisobutyrate) azelate.

10. Solid polypropylene in admixture with about 1 to 25% of the polyester bis-(2,2,4-trimethyl-1,3-pentanediol monoisobutyrate) sebacate.

11. Solid polypropylene in admixture with about 1 to 25% of the polyester bis-(2,2,4-trimethyl-1,3-pentanediol monoisobutyrate) 1,4-cyclohexane dicarboxylate.

12. Solid polypropylene in admixture with about 1 to 25% of the polyester bis-(2,2,4-trimethyl-1,3-pentanediol monoisobutyrate) o-phthalate.

13. Solid polypropylene in admixture with about 1 to 25% of the polyester bis-(2,2,4-trimethyl-1,3-pentanediol monoisobutyrate) isophthalate.

14. Solid polypropylene in admixture with about 1 to 25% of the polyester bis-(2,2,4-trimethyl-1,3-pentanediol monoisobutyrate) terephthalate.

15. Solid polypropylene in admixture with about 1 to 25% of the polyester bis-(2,2,4-trimethyl-1,3-pentanediol monoisobutyrate) diglycolate.

16. Solid polypropylene in admixture with about 1 to 25% of the polyester bis-(2,2,4-trimethyl-1,3-pentanediol monoisobutyrate) maleate.

17. Solid polypropylene in admixture with a polyester of 2,2,4-trimethyl-1,3-pentanediol mono (alkanoate containing 2 to 8 carbon atoms) with a dicarboxylic acid selected from oxalic acid, malonic acid, succinic acid, glutaric acid, 2,2-dimethylglutaric acid, adipic acid, 2,2,4-trimethyl adipic acid, azelaic acid, sebacic acid, maleic acid, fumaric acid, glutaconic acid, itaconic acid, allylmalonic acid, o-phthalic acid, isophthalic acid, terephthalic acid, diglycolic acid or 1,4-cyclohexane dicarboxylic acid, said polyester comprising about 1 to 25% by weight of the admixture.

References Cited by the Examiner

UNITED STATES PATENTS

| | | |
|---|---|---|
| 2,744,877 | 5/1956 | Smith. |
| 2,978,430 | 4/1961 | Thompson et al. |
| 3,091,632 | 5/1963 | Hogemeyer et al. ____ 260—476 |
| 3,201,364 | 8/1965 | Solyer. |
| 3,211,561 | 10/1965 | Gearhart et al. _____ 260—31.6 |

MORRIS LIEBMAN, Primary Examiner.

A. LIEBERMAN, Assistant Examiner.